United States Patent
Guo et al.

(10) Patent No.: US 12,045,926 B1
(45) Date of Patent: Jul. 23, 2024

(54) METHOD, APPARATUS AND DEVICE FOR CONVERTING TEXTURE MAP OF THREE-DIMENSIONAL MODEL, AND MEDIUM

(71) Applicants: Migu Co., Ltd, Beijing (CN); China Mobile Communications Group Co., Ltd., Beijing (CN)

(72) Inventors: Xufeng Guo, Beijing (CN); Honglong Zhang, Beijing (CN)

(73) Assignees: Migu Co., Ltd., Beijing (CN); China Mobile Communications Group Co., Ltd., Beijing (CN)

(*) Notice: Subject to any disclaimer, the term of this patent is extended or adjusted under 35 U.S.C. 154(b) by 0 days.

(21) Appl. No.: 18/572,511

(22) PCT Filed: Aug. 25, 2022

(86) PCT No.: PCT/CN2022/114853
§ 371 (c)(1),
(2) Date: Dec. 20, 2023

(87) PCT Pub. No.: WO2023/030163
PCT Pub. Date: Mar. 9, 2023

(30) Foreign Application Priority Data

Aug. 31, 2021 (CN) .......................... 202111017923.4

(51) Int. Cl.
*G06T 15/04* (2011.01)
(52) U.S. Cl.
CPC .................. *G06T 15/04* (2013.01)
(58) Field of Classification Search
CPC ...................................................... G06T 15/04
See application file for complete search history.

(56) References Cited

U.S. PATENT DOCUMENTS

| 5,537,638 A | 7/1996 | Morita et al. |
| 6,987,511 B2 * | 1/2006 | Taubin .................... G06T 17/20 |
| | | 345/611 |

(Continued)

FOREIGN PATENT DOCUMENTS

| CN | 108062784 A | 5/2018 |
| CN | 112102480 A | 12/2020 |

(Continued)

OTHER PUBLICATIONS

Sorkine (Laplacian Surface Editing) Eurographics Symposium on Geometry Processing (2004) (Year: 2004).*

(Continued)

*Primary Examiner* — Phuc N Doan
(74) *Attorney, Agent, or Firm* — Price Heneveld, LLP

(57) ABSTRACT

A method for converting a 3D model texture map, includes: determining a target plane based on coordinates of multiple initial key points in a 3D model, where the 3D model is divided into multiple faces, and the initial key points are boundary vertices of the faces; obtaining a key point set corresponding to each initial key point, where the key point set corresponding to each initial key point includes the coordinates of the each initial key point and initial key points in a neighborhood of the each initial key point; determining Laplace coordinates of each initial key point on the target plane based on each key point set; and inserting a texture map corresponding to each face into the target plane based on a preset algorithm and the Laplace coordinates of each initial key point, thereby obtaining a two-dimensional (2D) texture map.

9 Claims, 6 Drawing Sheets

(56) References Cited

U.S. PATENT DOCUMENTS

2016/0155262 A1    6/2016  Chen et al.
2023/0074094 A1*   3/2023  Hertzmann ............. G06T 17/20

FOREIGN PATENT DOCUMENTS

CN    113012271 A    6/2021
CN    113781622 A    12/2021

OTHER PUBLICATIONS

Hertzmann (ConTesse: Accurate Smooth Occluding Contours) (Year: 2018).*

* cited by examiner determining a projection plane of the key point set corresponding to each initial key point, where the projection plane is determined by a sum of distances from each initial key point in the key point set to the projection plane — S31 determining projection coordinates of coordinates of each initial key point in each key point set, on the projection plane — S32 determining Laplace coordinates of each initial key point on the target plane based on the projection coordinates corresponding to each key point set — S33

Fig. 5

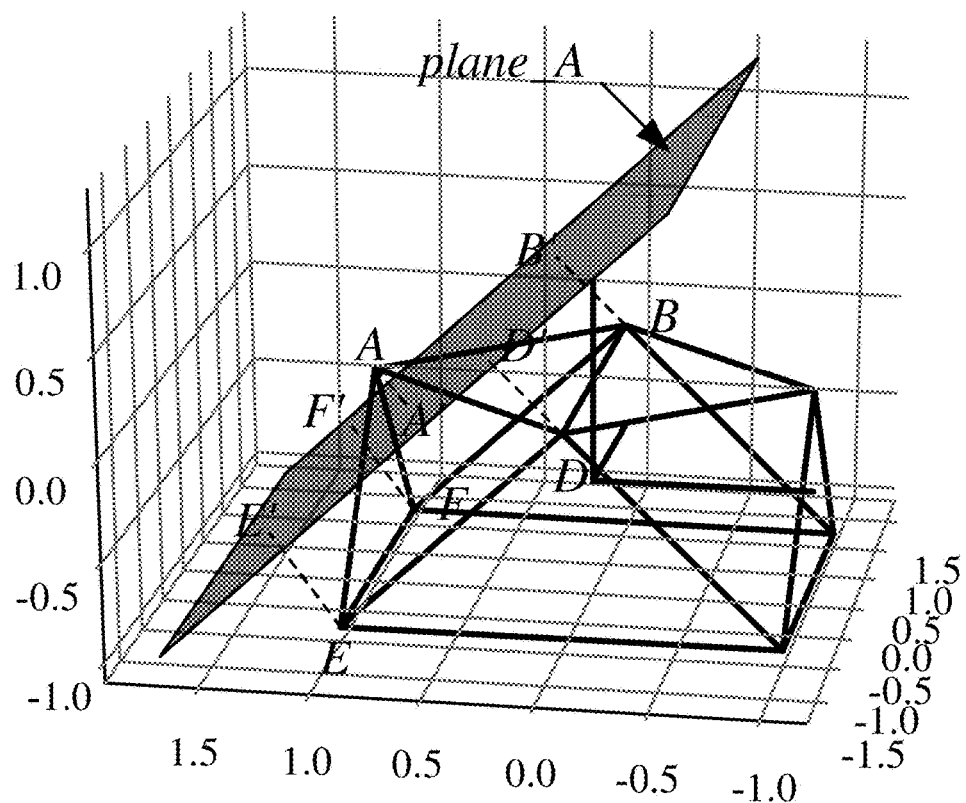

Fig. 6

METHOD, APPARATUS AND DEVICE FOR CONVERTING TEXTURE MAP OF THREE-DIMENSIONAL MODEL, AND MEDIUM

CROSS-REFERENCE TO RELATED APPLICATION

This application is the U.S. national phase of PCT Application PCT/CN2022/114853 filed on Aug. 25, 2022, which claims a priority of the Chinese patent application No. 202111017923.4 filed on Aug. 31, 2021, and entitled "method, apparatus and device for converting a texture map of a three-dimensional model, and medium", which is incorporated herein by reference in its entirety.

TECHNICAL FIELD

The present invention relates to the field of computer technologies, and relates to but is not limited to a method, an apparatus and a device for converting a texture map of a three-dimensional model, and a medium.

BACKGROUND

When using a three-dimensional (3D) modeling software, it is necessary to unwrap a texture of a 3D model to obtain a texture map that contains all texture information of the model, and to obtain a mapping relationship between the 3D model and the texture map. Different mapping relationships are corresponding to different texture maps.

Texture maps, which are obtained in processes of collecting and processing actual texture images, are usually a collection of a series of captured texture photos, include a lot of redundant information and cannot be directly used. Moreover, for an identical model, since different modelers unwrap a texture of the model in different ways, texture map details are easily lost, resulting in inaccurate texture maps of the unwrapped 3D model.

SUMMARY

The present invention provides a method, an apparatus and a device for converting a 3D model texture map, and a medium, to solve the problem of how to improve accuracy of a texture map of an unwrapped 3D model.

The present invention provides a method for converting a 3D model texture map, including:
  determining a target plane based on coordinates of multiple initial key points in a 3D model; wherein the 3D model is divided into multiple faces, and the initial key points are boundary vertices of the faces;
  obtaining a key point set corresponding to each initial key point; wherein the key point set corresponding to each initial key point includes the coordinates of the each initial key point and initial key points in a neighborhood of the each initial key point;
  determining Laplace coordinates of each initial key point on the target plane based on each key point set; and
  inserting a texture map corresponding to each face into the target plane based on a preset algorithm and the Laplace coordinates of each initial key point, thereby obtaining a two-dimensional (2D) texture map.

In one embodiment, the determining Laplace coordinates of each initial key point on the target plane based on each key point set, includes:
  determining a projection plane of the key point set corresponding to each initial key point; wherein the projection plane is determined by a sum of distances from each initial key point in the key point set to the projection plane;
  determining projection coordinates of coordinates of each initial key point in each key point set, on the projection plane; and
  determining the Laplace coordinates of each initial key point on the target plane based on the projection coordinates corresponding to each key point set.

In one embodiment, the determining the Laplace coordinates of each initial key point on the target plane based on the projection coordinates corresponding to each key point set, includes:
  obtaining a global normal vector of the target plane;
  determining a local normal vector of the projection plane;
  determining a rotation matrix based on a preset unit vector, the global normal vector and the local normal vector;
  determining rotation coordinates on the target plane corresponding to the projection coordinates on the projection plane based on the rotation matrix; and
  determining the Laplace coordinates based on the rotation coordinates on the target plane.

In one embodiment, the determining the Laplace coordinates based on the rotation coordinates on the target plane, includes:
  determining a Laplace equation based on each rotation coordinate on the target plane;
  determining the Laplace coordinates of each initial key point based on a preset anchor point and the Laplace equation corresponding to each key point set.

In one embodiment, the determining a rotation matrix based on a preset unit vector, the global normal vector and the local normal vector, includes:
  determining a rotation angle based on the global normal vector and the local normal vector; and
  determining the rotation matrix based on the preset unit vector and the rotation angle.

In one embodiment, the determining a target plane based on coordinates of multiple initial key points in a 3D model, includes:
  determining a global normal vector based on the coordinates of the multiple initial key points;
  determining two global basis vectors corresponding to the global normal vector based on a preset rule; wherein the global normal vector is perpendicular to the two global basis vectors; and
  determining the target plane based on the two global basis vectors.

In one embodiment, the determining a global normal vector based on the coordinates of the multiple initial key points, includes:
  determining a coordinate matrix based on the coordinates of the multiple initial key points;
  determining an average value of values of each row in the coordinate matrix;
  subtracting the average value of the each row from each value of the each row in the coordinate matrix, thereby obtaining a target matrix; and
  determining a singular vector corresponding to a minimum singular value of the target matrix as the global normal vector.

The present invention further provides apparatus for converting a three-dimensional (3D) model texture map, including:

a determination module configured to determine a target plane based on coordinates of multiple initial key points in a 3D model; wherein the 3D model is divided into multiple faces, and the initial key points are boundary vertices of the faces;

an obtaining module configured to obtain a key point set corresponding to each initial key point; wherein the key point set corresponding to each initial key point includes the coordinates of the each initial key point and initial key points in a neighborhood of the each initial key point;

a calculation module configured to determine Laplace coordinates of each initial key point on the target plane based on each key point set; and a conversion module configured to insert a texture map corresponding to each face into the target plane based on a preset algorithm and the Laplace coordinates of each initial key point, thereby obtaining a two-dimensional (2D) texture map.

The present invention further provides a device for converting a 3D model texture map, including: a memory, a processor, and a program for converting the 3D model texture map stored in the memory and executable on the processor, wherein the program for converting the 3D model texture map, when executed by the processor, performs the above method for converting a 3D model texture map.

The present invention further provides a computer-readable storage medium, including: a program for converting a 3D model texture map stored thereon; wherein the program for converting the 3D model texture map, when executed by a processor, performs the above method for converting a 3D model texture map.

In the method, the apparatus and the device for converting a 3D model texture map, and the computer-readable storage medium provided in the present invention, the target plane is determined based on the coordinates of multiple initial key points in the 3D model; the key point set corresponding to each initial key point is obtained; the Laplace coordinates of each initial key point on the target plane is obtained based on each key point set; and the texture map corresponding to each face is inserted into the target plane based on the preset algorithm and the Laplace coordinates of each initial key point, thereby obtaining a 2D texture map. The present invention realizes conversion of a 3D model into a 2D texture map, and the generated 2D texture map retains detailed information of texture maps, thereby improving accuracy of the texture map of the unwrapped 3D model.

BRIEF DESCRIPTION OF THE DRAWINGS

FIG. 5 is a schematic flowchart showing detailed process of a step S30 of a second embodiment of a method for converting a 3D model texture map according to the present invention;

FIG. 6 is a schematic diagram of a projection plane in a method for converting a 3D model texture map according to the present invention;

Realization of purposes, functional features and advantages of the present invention will be further described with reference to the embodiments and the accompanying drawings.

DETAILED DESCRIPTION

It is to be understood that specific embodiments described here are only intended to explain the present invention and are not intended to limit the present invention.

A main solution of embodiments of the present invention is to determine a target plane based on coordinates of multiple initial key points in a 3D model, obtain a key point set corresponding to each initial key point, determine Laplace coordinates of each initial key point on the target plane based on each key point set, and insert a texture map corresponding to each face into the target plane based on a preset algorithm and the Laplace coordinates of each initial key point, thereby obtaining a 2D texture map. The present invention realizes conversion of a 3D model into a 2D texture map, and the generated 2D texture map retains detailed information of texture maps, thereby improving accuracy of the texture map of the unwrapped 3D model.

Figure 1:
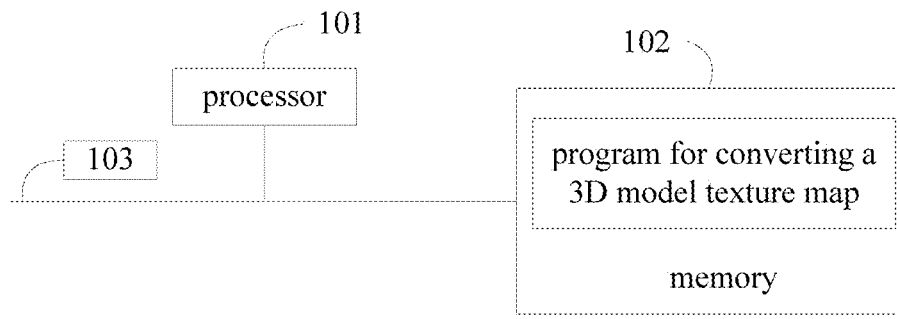
FIG. 1 is a schematic diagram showing hardware structures of a device for converting a 3D model texture map according to an embodiment of the present invention.

As an implementation solution, a device for converting a 3D model texture map is shown in FIG. 1.

The embodiment of the present invention relates to a device for converting a 3D model texture map, which includes: a processor 101 such as a central processing unit (CPU), a memory 102 and a communication bus 103. The communication bus 103 is used to implement communication between these components.

The memory 102 may be a high-speed random access memory (RAM) or, may be a stable non-volatile memory (NVM) such as disk storage. As shown in FIG. 1, the memory 102, as a computer-readable storage medium, may include a program for converting a 3D model texture map. The processor 101 is configured to call the program for converting the 3D model texture map stored in the memory 102 and perform the following operations:

determining a target plane based on coordinates of multiple initial key points in a 3D model, where the 3D model is divided into multiple faces, and the initial key points are boundary vertices of the faces;

obtaining a key point set corresponding to each initial key point, where the key point set corresponding to each initial key point includes the coordinates of the initial key point and initial key points in a neighborhood of the initial key point;

determining Laplace coordinates of each initial key point on the target plane based on each key point set; and inserting a texture map corresponding to each face into the target plane based on a preset algorithm and the Laplace coordinates of each initial key point, thereby obtaining a 2D texture map.

In one embodiment, the processor 101 is configured to call the program for converting the 3D model texture map stored in the memory 102 and perform the following operations:

determining a projection plane of the key point set corresponding to each initial key point, where the projection plane is determined by a sum of distances from each initial key point in the key point set to the projection plane;

determining projection coordinates of coordinates of each initial key point in each key point set, on the projection plane; and determining Laplace coordinates of each initial key point on the target plane based on the projection coordinates corresponding to each key point set.

In one embodiment, the processor 101 is configured to call the program for converting the 3D model texture map stored in the memory 102 and perform the following operations:

obtaining a global normal vector of the target plane;

determining a local normal vector of the projection plane;

determining a rotation matrix based on a preset unit vector, the global normal vector and the local normal vector;

determining rotation coordinates on the target plane corresponding to the projection coordinates on the projection plane based on the rotation matrix; and determining the Laplace coordinates based on the rotation coordinates on the target plane.

In one embodiment, the processor 101 is configured to call the program for converting the 3D model texture map stored in the memory 102 and perform the following operations:

determining a Laplace equation based on various rotation coordinates on the target plane;

determining Laplace coordinates of each initial key point based on a preset anchor point and the Laplace equation corresponding to each key point set.

In one embodiment, the processor 101 is configured to call the program for converting the 3D model texture map stored in the memory 102 and perform the following operations:

determining a rotation angle based on the global normal vector and the local normal vector;

determining the rotation matrix based on the preset unit vector and the rotation angle.

In one embodiment, the processor 101 is configured to call the program for converting the 3D model texture map stored in the memory 102 and perform the following operations:

determining a global normal vector based on coordinates of multiple initial key points;

determining two global basis vectors corresponding to the global normal vector based on a preset rule, where the global normal vector is perpendicular to the two global basis vectors;

determining the target plane based on the two global basis vectors.

In one embodiment, the processor 101 is configured to call the program for converting the 3D model texture map stored in the memory 102 and perform the following operations:

determining a coordinate matrix based on coordinates of multiple initial key points;

determining an average value of values of each row in the coordinate matrix;

subtracting the average value of the each row from each value of the each row in the coordinate matrix, thereby obtaining a target matrix;

determining a singular vector corresponding to a minimum singular value of the target matrix as the global normal vector.

Based on the hardware structure of the device for converting the 3D model texture map mentioned above, one embodiment of a method for converting a 3D model texture map of the present invention is proposed.

Figure 2:
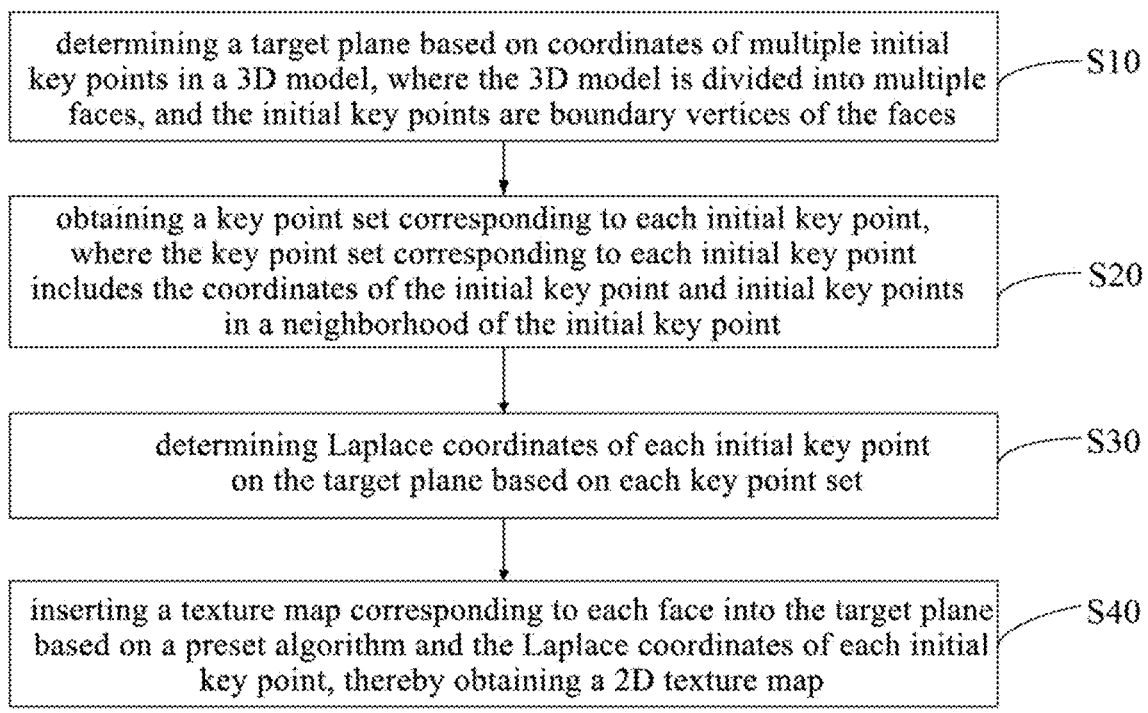
FIG. 2 is a schematic flowchart of a first embodiment of a method for converting a 3D model texture map according to the present invention.

Referring to FIG. 2, FIG. 2 shows a first embodiment of a method for converting a 3D model texture map of the present invention. The method for converting the 3D model texture map includes the following steps.

Step S10: determining a target plane based on coordinates of multiple initial key points in a 3D model, where the 3D model is divided into multiple faces, and the initial key points are boundary vertices of the faces.

Figure 3:
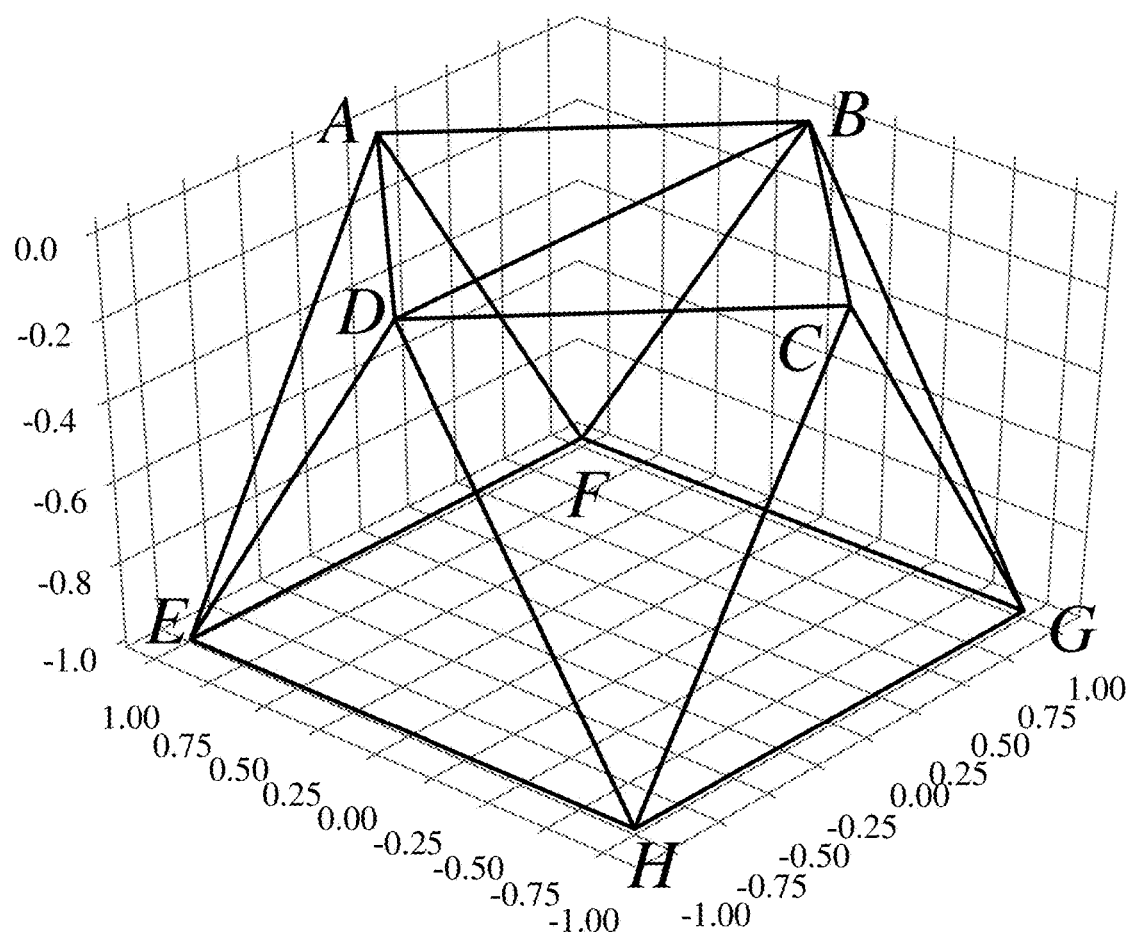
FIG. 3 is a schematic diagram of a 3D model in a method for converting a 3D model texture map according to the present invention.

For example, multiple initial key points may be key points taken from a human face surface, and the number of the initial key points may be thousands. The 3D model may be a 3D model of a human face. The 3D model is divided into multiple faces, and the initial key points are boundary vertices of the faces. For example, as shown in FIG. 3, the number of the initial key points corresponding to the 3D model may be eight, that is, eight points A, B, C, D, E, F, G and H are boundary vertices of the 3D model. Coordinates of the initial key point A are (0, 1, 0), coordinates of the initial key point B are (1, 0, 0), coordinates of the initial key point C are (0, −1, 0), coordinates of the initial key point D are (−1, 0, 0), coordinates of the initial key point E are (−1, 1, −1), coordinates of the initial key point F are (1, 1, −1), coordinates of the initial key point G are (1, −1, −1), and coordinates of the initial key point H are (−1, −1, −1). AEF, ABF, BFG, BCG, CGH, DCH, DEH, ADE, ABD and BCD are faces of the 3D model.

Determining the target plane based on the coordinates of multiple initial key points in the 3D model, may include determining a normal vector of the 3D model based on the initial key points, and selecting a plane perpendicular to the normal vector as the target plane.

Step S20: obtaining a key point set corresponding to each initial key point, where the key point set corresponding to each initial key point includes coordinates of the initial key point and initial key points in a neighborhood of the initial key point.

For example, a key point set corresponding to each initial key point is obtained, and the key point set corresponding to each initial key point includes coordinates of the initial key point and initial key points in a neighborhood of the initial key point. For example, as shown in FIG. 3, initial key points in a neighborhood of the initial key point A include B, D, E and F; initial key points in a neighborhood of the initial key point B include A, C, D, F and G.

Step S30: determining Laplace coordinates of each initial key point on the target plane based on each key point set.

For example, a projection plane corresponding to each key point set is determined, and projection coordinates of each initial key point in each key point set on the projection plane corresponding to the key point set are determined, and then rotation coordinates of each initial key point on the target plane are determined based on the projection coordinates, and then Laplace coordinates of each initial key point are determined based on the rotation coordinates on the target plane.

Step S40: inserting a texture map corresponding to each face into the target plane based on a preset algorithm and the Laplace coordinates of each initial key point, thereby obtaining a 2D texture map.

Figure 4:
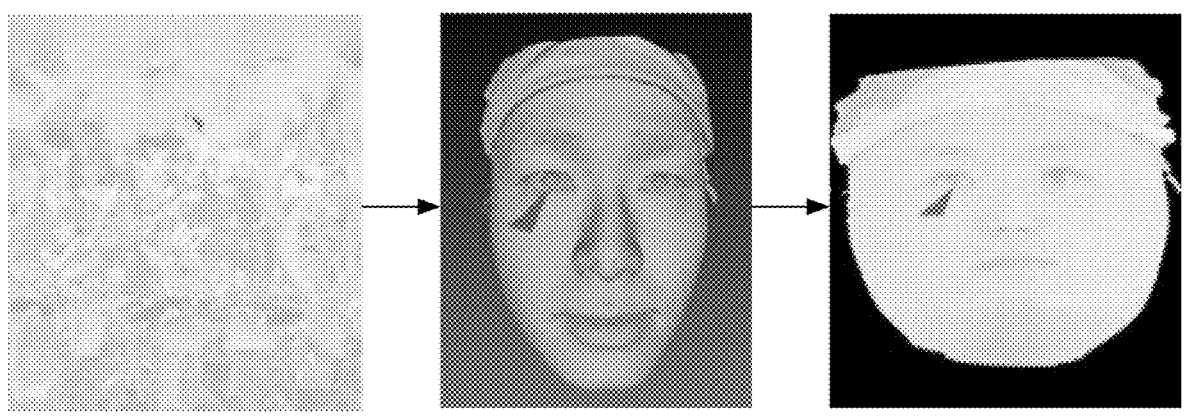
FIG. 4 is a schematic diagram showing a conversion result of a texture map of a 3D model according to the present invention.

For example, the texture map corresponding to each face is inserted into the target plane based on the preset algorithm and the Laplace coordinates of each initial key point, thereby obtaining a 2D texture map. The preset algorithm may be a triangular interpolation algorithm or other types of algorithms, which are not limited in the embodiments of the present invention. For example, as shown in FIG. 3, after determining the Laplace coordinates of the initial key points A, B, C, D, E, F, G and H on the target plane, texture maps of the ten faces including AEF, ABF, BFG, BCG, CGH, DCH, DEH, ADE, ABD and BCD are transferred from the 3D model to the target plane. As shown in FIG. 4, FIG. 4a shows a 3D model, and FIG. 4b shows a 2D texture map.

In the technical solution of the embodiment, the target plane is determined based on the coordinates of multiple initial key points in the 3D model; the key point set corresponding to each initial key point is obtained; the Laplace coordinates of each initial key point on the target plane is obtained based on each key point set; and the texture map corresponding to each face is inserted into the target plane based on the preset algorithm and the Laplace coordinates of each initial key point, thereby obtaining the 2D texture map. The present invention realizes conversion of a 3D model into a 2D texture map, and the generated 2D texture map retains detailed information of texture maps, thereby improving accuracy of the texture map of the unwrapped 3D model.

Referring to FIG. 5, FIG. 5 is a second embodiment of the method for converting the 3D model texture map of the present invention. Based on the first embodiment, the step S30 can include:

Step S31: determining a projection plane of the key point set corresponding to each initial key point, where the projection plane is determined by a sum of distances from each initial key point in the key point set to the projection plane;

Step S32: determining projection coordinates of coordinates of each initial key point in each key point set, on the projection plane;

Step S33: determining Laplace coordinates of each initial key point on the target plane based on the projection coordinates corresponding to each key point set.

For example, determining the projection plane of the key point set corresponding to each initial key point, may include calculating a sum of distances from each initial key point in the key point set to an identical plane, and using one plane with the smallest sum of distances from each initial key point to the same one plane, as the projection plane of the key point set. One key point set corresponding to the initial key point A is {A, B, D, E, F}, and a coordinate matrix corresponding to the key point set is decentralized to obtain a coordinate matrix vA. Principal component analysis (PCA) dimensionality reduction processing is peformed on the vA to obtain a projection plane plane_A composed of two principal directions of vA, and then projection coordinates of the coordinates of each initial key point in each key point set, on the projection plane, are determined. For example, as shown in FIG. 6, one projection plane corresponding to the initial key point A is plane_A, projection coordinates of the initial key point A on the projection plane plane_A are A', and projection coordinates of the initial key point B on the projection plane plane_A are B', projection coordinates of the initial key point D on the projection plane plane_A are D', projection coordinates of the initial key point E on the projection plane plane_A are E', and projection coordinates of the initial key point F on the projection plane plane_A are F'.

The determining Laplace coordinates of each initial key point on the target plane based on the projection coordinates corresponding to each key point set, may include: determining rotation coordinates of each initial key point on the target plane based on the projection coordinates, and determining the Laplace coordinates of each initial key point based on the rotation coordinates on the target plane.

In the technical solution of the embodiment, the projection plane of the key point set corresponding to each initial key point is determined, and the projection coordinates of the coordinates of each initial key point in each key point set on the projection plane are determined, and then the Laplace coordinates of each initial key point on the target plane are determined based on the projection coordinates corresponding to each key point set. Determining the Laplace coordinates of each initial key point on the target plane based on the projection coordinates on the projection plane, facilitates subsequent insertion of the texture map corresponding to each face into the target plane to obtain the 2D texture map.

Figure 7:
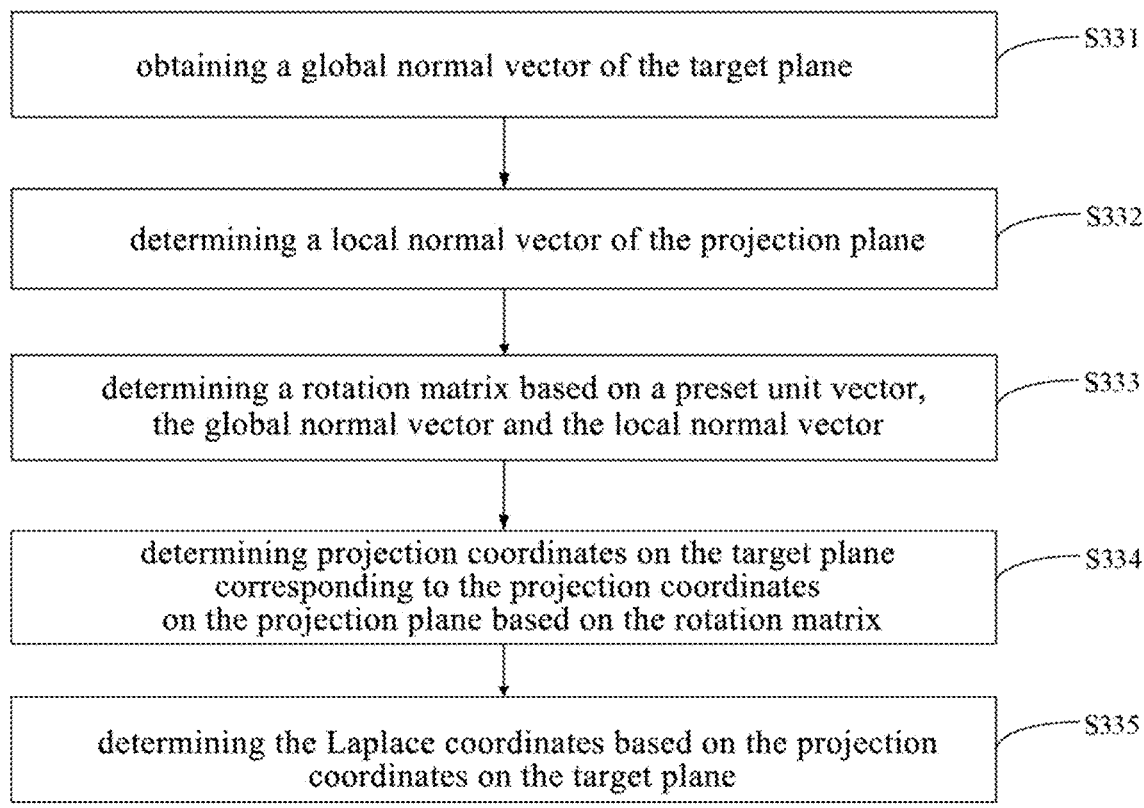
FIG. 7 is a schematic flowchart showing detailed process of a step S33 of a third embodiment of a method for converting a 3D model texture map according to the present invention.

Referring to FIG. 7, FIG. 7 is a third embodiment of the method for converting the 3D model texture map of the present invention. Based on the second embodiment, the step S33 includes:

Step S331: obtaining a global normal vector of the target plane;

Step S332: determining a local normal vector of the projection plane;

Step S333: determining a rotation matrix based on a preset unit vector, the global normal vector and the local normal vector;

Step S334: determining projection coordinates on the target plane corresponding to the projection coordinates on the projection plane based on the rotation matrix;

Step S335: determining the Laplace coordinates based on the projection coordinates on the target plane.

For example, the global normal vector of the target plane is perpendicular to the target plane, and the local normal vector of the projection plane is perpendicular to the projection plane.

Figure 8:
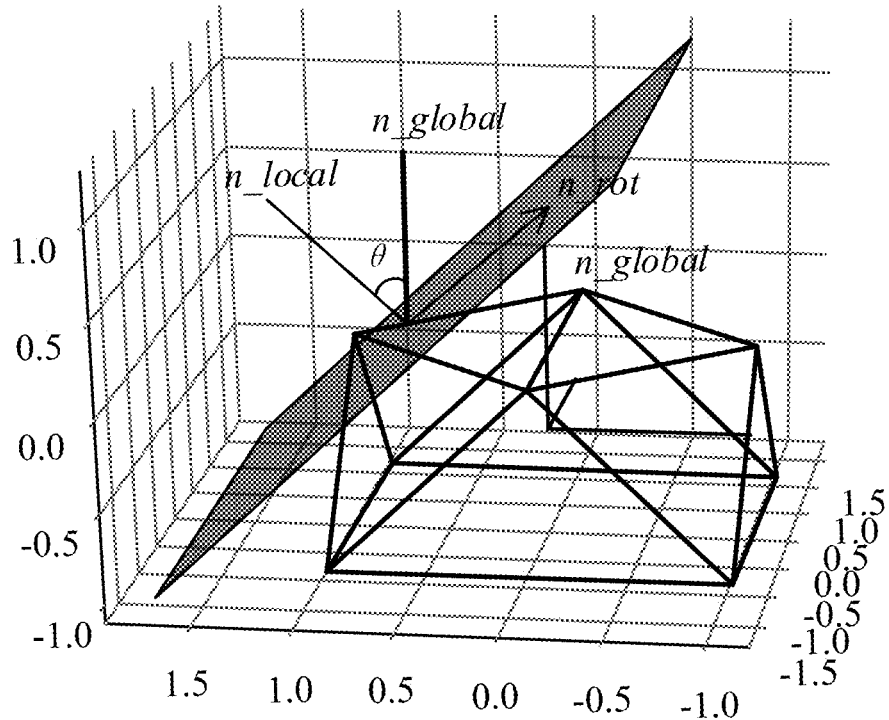
FIG. 8 is a schematic diagram showing a global normal vector and a local normal vector in a method for converting a 3D model texture map according to the present invention.

The determining the rotation matrix based on the preset unit vector, the global normal vector and the local normal vector, may include first determining a rotation angle based on the global normal vector and local normal vector. For example, as shown in FIG. 8, the global normal vector is n_global, the local normal vector is n_local, the rotation angle is an angle θ between the global normal vector and the local normal vector; and the rotation matrix is determined based on the preset unit vector and the rotation angle.

If n_rot=n_local×n_global is a rotation axis, A', B', D', E' and F' are rotated around the rotation axis n_rot by θ, so that n_local is rotated to the direction of n_global. It is assumed that a unit vector of the rotation axis is n_rot=[$n_x$, $n_y$, $n_z$], and the rotation angle is θ, then the rotation matrix matrix_rotation_local is as follows:

$$\begin{bmatrix} \cos\theta + n_x^2 \cdot (1-\cos\theta) & n_x \cdot n_y \cdot (1-\cos\theta) - n_z \cdot \sin\theta & n_x \cdot n_y \cdot (1-\cos\theta) + n_y \cdot \sin\theta \\ n_y \cdot n_x \cdot (1-\cos\theta) + n_z \cdot \sin\theta & \cos\theta + n_y^2 \cdot (1-\cos\theta) & n_y \cdot n_z \cdot (1-\cos\theta) - n_x \cdot \sin\theta \\ n_z \cdot n_x \cdot (1-\cos\theta) - n_y \cdot \sin\theta & n_z \cdot n_y \cdot (1-\cos\theta) + n_x \cdot \sin\theta & \cos\theta + n_z^2 \cdot (1-\cos\theta) \end{bmatrix};$$

Projection points of the key point set corresponding to the initial key point A on the plane_A include A', B', D', E' and F', and the points after rotation are A", B", D", E" and F". In the 3D model shown in FIG. 3, the coordinate matrices corresponding to A', B', D', E' and F' are left multiplied by the corresponding rotation matrix, thereby obtaining a matrix point_rot corresponding to the rotation coordinates as follows:

$$\text{point\_rot} = \begin{bmatrix} 0 & 1 & -1 & -1 & 1 \\ 0 & -0.707 & -0.707 & 0.707 & 0.707 \\ 0 & 0 & 0 & 0 & 0 \end{bmatrix}.$$

Figure 9:
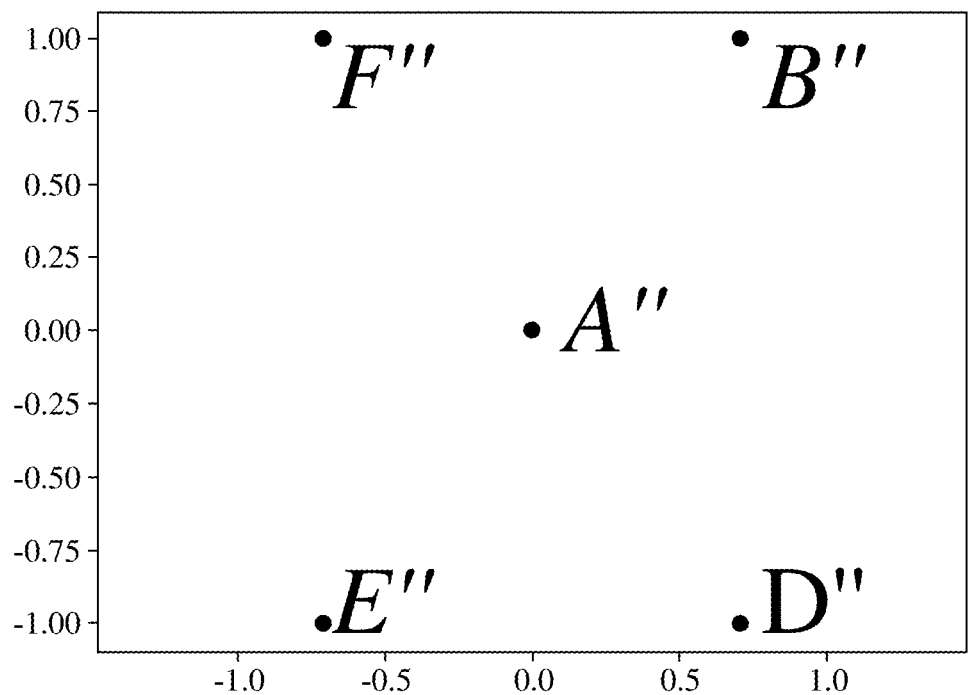
FIG. 9 is a schematic diagram showing corresponding coordinates when an initial key point in a key point set are converted to a target plane in a method for converting a 3D model texture map according to the present invention.

The matrix point_local of rotation coordinates of A", B", D", E" and F" on basis vectors $b_1 \times b_2$ of the target plane is:

$$\text{point\_local} = (b_1; b_2)' * \text{point\_rot};$$

$$\text{point\_local} = \begin{bmatrix} 0 & 0.707 & 0707 & -0.707 & -0.707 \\ 0 & 1 & -1 & -1 & 1 \end{bmatrix};$$

where $b_1$ and $b_2$ are the basis vectors of the target plane. For example, positions of A", B", D", E" and F" on the target plane are shown in FIG. 9.

A Laplace equation is determined based on the rotation coordinates on the target plane; and the Laplace coordinates of each initial key point are determined based on a preset anchor point and the Laplace equation corresponding to each key point set.

Due to the fact that the coordinates of A", B", D", E" and F" in the new coordinate system have two components, for example, there are two Laplace equations corresponding to the point A", and a Laplace equation for a coordinate x is as follows:

$$\frac{1}{4}x_B + \frac{1}{4}x_D + \frac{1}{4}x_E + \frac{1}{4}x_F - x_A =$$

$$\frac{1}{4} \cdot 0.707 + \frac{1}{4} \cdot 0.707 - \frac{1}{4} \cdot 0.707 - \frac{1}{4} \cdot 0.707 - 0 = 0;$$

and a Laplace equation for a coordinate y is as follows:

$$\frac{1}{4}y_B + \frac{1}{4}y_D + \frac{1}{4}y_E + \frac{1}{4}y_F - y_A = \frac{1}{4} \cdot 1 + \frac{1}{4} \cdot 1 - \frac{1}{4} \cdot 1 - \frac{1}{4} \cdot 1 - 0 = 0;$$

The above Laplace equations for x and y coordinates are the Laplace equations corresponding to the initial key point A; similarly, the initial key points A, B, C, D, E, F, G and H respectively correspond to two Laplace equations, resulting in 16 Laplace coordinate equations.

Figure 10:
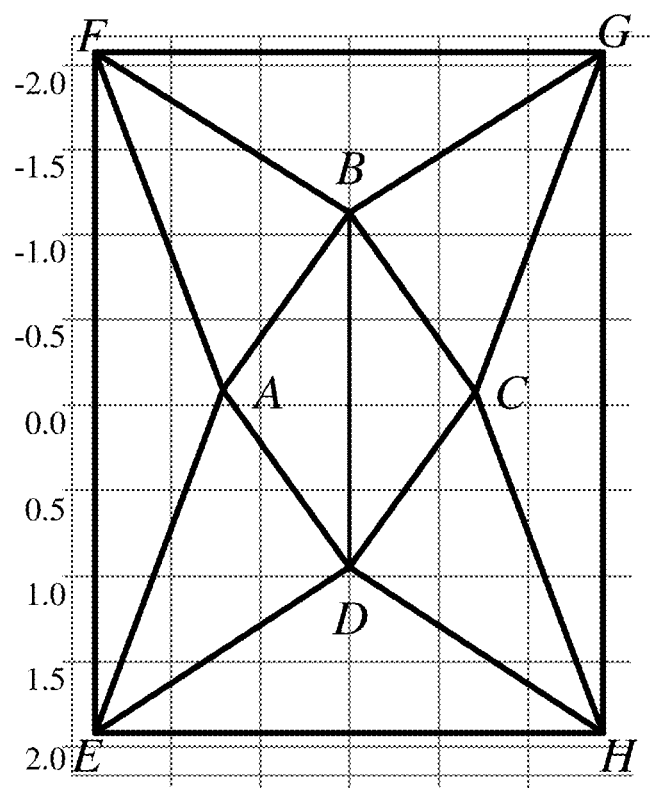
FIG. 10 is a schematic diagram showing Laplace coordinates of each initial key point on a target plane in a method for converting a 3D model texture map according to the present invention.

The Laplace coordinates of each initial key point are determined based on the preset anchor point and the Laplace equation corresponding to each key point set. For example, the anchor point may be selected as $x_A=0$, $y_A=0$. From these two equations and 16 Laplace coordinate equations, the x and y coordinates of 8 points can be solved. Distribution of 8 points on the target plane can be shown in FIG. 10.

In the technical solution of the embodiment, the global normal vector of the target plane is obtained; the local normal vector of the projection plane is determined; the rotation matrix is determined based on the preset unit vector, the global normal vector and the local normal vector; the projection coordinates on the target plane corresponding to the projection coordinates on the projection plane are determined based on the rotation matrix; and the Laplace coordinates are determined based on the projection coordinates on the target plane. The Laplace coordinates of the projection coordinates on the target plane are determined based on the global normal vector of the target plane and the local normal vector of the projection plane, which facilitates subsequent insertion of the texture map corresponding to each face into the target plane.

Figure 11:
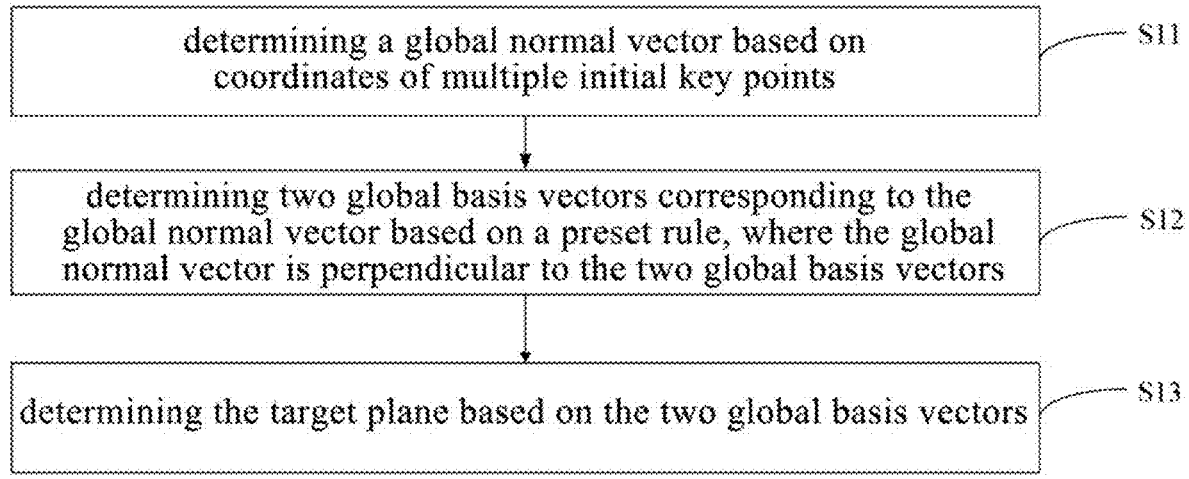
FIG. 11 is a schematic flowchart showing detailed process of a step S10 of a fourth embodiment of a method for converting a 3D model texture map according to the present invention.

Referring to FIG. 11, FIG. 11 is a fourth embodiment of the method for converting the 3D model texture map of the present invention. Based on any one of the first to third embodiments, the step S10 includes:

Step S11: determining a global normal vector based on coordinates of multiple initial key points;

Step S12: determining two global basis vectors corresponding to the global normal vector based on a preset rule, where the global normal vector is perpendicular to the two global basis vectors;

Step S13: determining the target plane based on the two global basis vectors.

For example, it is assumed that coordinates of the initial key point A are (0, 1, 0), coordinates of the initial key point B are (1, 0, 0), coordinates of the initial key point C are (0, −1, 0), coordinates of the initial key point D are (−1, 0, 0), coordinates of the initial key point E are (−1, 1, −1), coordinates of the initial key point F are (1, 1, −1), coordinates of the initial key point G are (1, −1, −1), and coordinates of the initial key point H are (−1, −1, −1).

Based on the coordinates of multiple initial key points, a coordinate matrix is determined as follows:

$$\begin{bmatrix} -1 & -1 & 1 & 1 & 0 & -1 & 0 & 1 \\ 1 & -1 & -1 & 1 & 1 & 0 & -1 & 0 \\ -1 & -1 & -1 & -1 & 0 & 0 & 0 & 0 \end{bmatrix}.$$

An average value of values of each row in the coordinate matrix is determined as $$\frac{1}{8}\sum_{j=1}^{8} vsRaw[:,j];$$

the average value of each row is subtracted from each value of each row in the coordinate matrix, thereby obtaining a target matrix, which is expressed with the following formula:

$$vs[:,i] = vsRaw[:,i] - \frac{1}{8}\sum_{j=1}^{8} vsRaw[:,j]$$

where vs[:,i] represents an i-th column of a matrix vs, vsRaw[:,i] represents a j-th column of a matrix vsRaw. The target matrix is as follows:

$$\begin{bmatrix} -1 & -1 & 1 & 1 & 0 & -1 & 0 & 1 \\ 1 & -1 & -1 & 1 & 1 & 0 & -1 & 0 \\ -0.5 & -0.5 & -0.5 & -0.5 & 0.5 & 0.5 & 0.5 & 0.5 \end{bmatrix}.$$

Singular value decomposition is performed on the matrix vs as follows:

$$vs = u \cdot s \cdot v^T;$$

where $$u = \begin{bmatrix} 0 & 1 & 0 \\ -1 & 0 & 0 \\ 0 & 0 & 1 \end{bmatrix}; s = [\,2.449 \quad 2.449 \quad 1.414\,];$$

$$v = \begin{bmatrix} -0.408 & 0.408 & 0.408 & -0.408 & -0.408 & 0.000 & 0.408 & 0.000 \\ -0.408 & -0.408 & 0.408 & 0.408 & 0.000 & -0.408 & 0.000 & 0.408 \\ -0.354 & -0.354 & -0.354 & -0.354 & 0.354 & 0.354 & 0.354 & 0.354 \\ -0.227 & 0.476 & -0.374 & 0.670 & -0.034 & 0.159 & 0.307 & 0.113 \\ -0.032 & 0.391 & 0.372 & -0.018 & 0.835 & -0.075 & 0.022 & -0.069 \\ -0.035 & -0.142 & 0.461 & 0.239 & -0.062 & 0.819 & -0.177 & -0.058 \\ 0.492 & -0.277 & 0.198 & 0.164 & 0.027 & -0.032 & 0.762 & -0.179 \\ 0.496 & 0.256 & 0.109 & -0.093 & -0.077 & 0.074 & -0.039 & 0.810 \end{bmatrix};$$

A singular vector corresponding to the minimum singular value of the target matrix is determined as the global normal vector. For example, the third column vector of the u matrix is selected as n_global=u[:,3]=[0, 0, 1]', the basis vector of the target plane can be determined by the right-hand rule to be $b_1$=u[:,1]=[0,−1, 0]' and $b_2$=u[:,2]=[1, 0, 0]'.

In the technical solution of the embodiment, the coordinate matrix is determined based on the coordinates of multiple initial key points; the average value of the values of each row in the coordinate matrix is determined; the target matrix is obtained by subtracting the average value of each row from each value of each row in the coordinate matrix; and the singular vector corresponding to the minimum singular value of the target matrix, is determined as the global normal vector. When the global normal vector corresponding to the target plane is determined, the target plane can be determined based on the basis vector of the global normal vector, which facilitates subsequent accurate insertion of the texture map corresponding to each face into the target plane.

Figure 12:
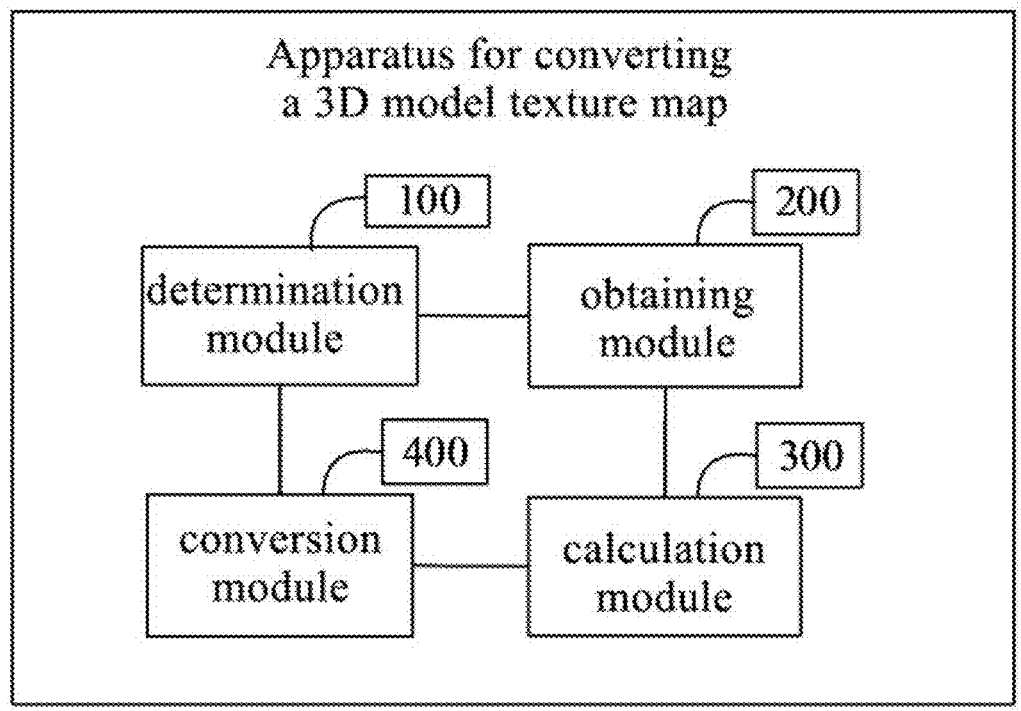
FIG. 12 is a schematic diagram showing logical structures of an apparatus for converting a 3D model texture map according to the present invention.

Referring to FIG. 12, the present invention further provides an apparatus for converting a 3D model texture map, which includes:

a determination module 100 configured to determine a target plane based on coordinates of multiple initial key points in a 3D model, where the 3D model is divided into multiple faces, and the initial key points are boundary vertices of the faces;

an obtaining module 200 configured to obtain a key point set corresponding to each initial key point, where the key point set corresponding to each initial key point includes the coordinates of the initial key point and initial key points in a neighborhood of the initial key point;

a calculation module 300 configured to determine Laplace coordinates of each initial key point on the target plane based on each key point set; and a conversion module 400 configured to insert a texture map corresponding to each face into the target plane based on a preset algorithm and the Laplace coordinates of each initial key point, thereby obtaining a 2D texture map.

In one embodiment, when determining Laplace coordinates of each initial key point on the target plane based on each key point set, the calculation module 300 is specifically configured to:

determine a projection plane of the key point set corresponding to each initial key point, where the projection plane is determined by a sum of distances from each initial key point in the key point set to the projection plane;

determine projection coordinates of coordinates of each initial key point in each key point set, on the projection plane; and determine Laplace coordinates of each initial key point on the target plane based on the projection coordinates corresponding to each key point set.

In one embodiment, when determine Laplace coordinates of each initial key point on the target plane based on the projection coordinates corresponding to each key point set, the calculation module 300 is specifically configured to:

obtain a global normal vector of the target plane;

determine a local normal vector of the projection plane;

determine a rotation matrix based on a preset unit vector, the global normal vector and the local normal vector;

determine rotation coordinates on the target plane corresponding to the projection coordinates on the projection plane based on the rotation matrix; and determine the Laplace coordinates based on the rotation coordinates on the target plane.

In one embodiment, when determine the Laplace coordinates based on the rotation coordinates on the target plane, the calculation module 300 is specifically configured to:

determine a Laplace equation based on various rotation coordinates on the target plane;

determine Laplace coordinates of each initial key point based on a preset anchor point and the Laplace equation corresponding to each key point set.

In one embodiment, when determine a rotation matrix based on a preset unit vector, the global normal vector and the local normal vector, the calculation module 300 is specifically configured to:

determine a rotation angle based on the global normal vector and the local normal vector;

determine the rotation matrix based on the preset unit vector and the rotation angle.

In one embodiment, when determining a target plane based on coordinates of multiple initial key points in the 3D model, the determination module 100 is specifically configured to:

determine a global normal vector based on the coordinates of multiple initial key points;

determine two global basis vectors corresponding to the global normal vector based on a preset rule, where the global normal vector is perpendicular to the two global basis vectors;

determining the target plane based on two global basis vectors.

In one embodiment, when determining a global normal vector based on the coordinates of multiple initial key points, the determination module 100 is specifically configured to:

determine a coordinate matrix based on the coordinates of multiple initial key points;

determine an average value of values of each row in the coordinate matrix;

subtract the average value of the each row from each value of the each row in the coordinate matrix, thereby obtaining a target matrix;

determine a singular vector corresponding to a minimum singular value of the target matrix as the global normal vector.

The present invention further provides a device for converting a 3D model texture map, including a memory, a processor, and a program for converting a 3D model texture map stored in the memory and executable on the processor. The program for converting the 3D model texture map, when executed by the processor, performs the above steps of the method for converting a 3D model texture map.

The present invention further provides a computer-readable storage medium, including a program for converting a 3D model texture map stored thereon. The program for converting the 3D model texture map, when executed by a processor, performs the above steps of the method for converting a 3D model texture map.

The above serial numbers of the embodiments of the present invention are only for description and do not represent advantages and disadvantages of the embodiments.

It is to be noted that, in this specification, the terms "include", "comprise", or any other variant thereof are intended to cover a non-exclusive inclusion, so that a process, a system, an item, or an apparatus that includes a list of elements not only includes those elements but also includes other elements which are not expressly listed, or further includes elements inherent to such process, system, item, or apparatus. An element limited by "includes a . . . " does not, without more constraints, preclude the presence of additional identical elements in the process, system, item, or apparatus that includes the element.

According to the descriptions of the foregoing implementations, a person skilled in the art may clearly understand that the foregoing embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the system described in the embodiments of this application.

The above are only preferred embodiments of the present invention and do not limit patent scope of the present invention. Any equivalent structure or equivalent process transformation made by using the description and accompanying drawings of the present invention, or directly or indirectly applied in other related technical neighborhoods, are equally included in the patent protection scope of the present invention.

What is claimed is:

1. A method for converting a three-dimensional (3D) model texture map, comprising:

determining a target plane based on coordinates of multiple initial key points in a 3D model; wherein the 3D model is divided into multiple faces, and the initial key points are boundary vertices of the faces;

obtaining a key point set corresponding to each initial key point; wherein the key point set corresponding to each initial key point includes the coordinates of the each initial key point and initial key points in a neighborhood of the each initial key point;

determining Laplace coordinates of each initial key point on the target plane based on each key point set; and inserting a texture map corresponding to each face into the target plane based on a preset algorithm and the Laplace coordinates of each initial key point, thereby obtaining a two-dimensional (2D) texture map.

2. The method according to claim 1, wherein the determining Laplace coordinates of each initial key point on the target plane based on each key point set, includes:

determining a projection plane of the key point set corresponding to each initial key point; wherein the projection plane is determined by a sum of distances from each initial key point in the key point set to the projection plane;

determining projection coordinates of coordinates of each initial key point in each key point set, on the projection plane; and determining the Laplace coordinates of each initial key point on the target plane based on the projection coordinates corresponding to each key point set.

3. The method according to claim 2, wherein the determining the Laplace coordinates of each initial key point on the target plane based on the projection coordinates corresponding to each key point set, includes:

obtaining a global normal vector of the target plane;

determining a local normal vector of the projection plane;

determining a rotation matrix based on a preset unit vector, the global normal vector and the local normal vector;

determining rotation coordinates on the target plane corresponding to the projection coordinates on the projection plane based on the rotation matrix; and determining the Laplace coordinates based on the rotation coordinates on the target plane.

4. The method according to claim 3, wherein the determining the Laplace coordinates based on the rotation coordinates on the target plane, includes:
- determining a Laplace equation based on each rotation coordinate on the target plane;
- determining the Laplace coordinates of each initial key point based on a preset anchor point and the Laplace equation corresponding to each key point set.

5. The method according to claim 3, wherein the determining a rotation matrix based on a preset unit vector, the global normal vector and the local normal vector, includes:
- determining a rotation angle based on the global normal vector and the local normal vector; and
- determining the rotation matrix based on the preset unit vector and the rotation angle.

6. The method according to claim 1, wherein the determining a target plane based on coordinates of multiple initial key points in a 3D model, includes:
- determining a global normal vector based on the coordinates of the multiple initial key points;
- determining two global basis vectors corresponding to the global normal vector based on a preset rule; wherein the global normal vector is perpendicular to the two global basis vectors; and
- determining the target plane based on the two global basis vectors.

7. The method according to claim 6, wherein the determining a global normal vector based on the coordinates of the multiple initial key points, includes:
- determining a coordinate matrix based on the coordinates of the multiple initial key points;
- determining an average value of values of each row in the coordinate matrix;
- subtracting the average value of the each row from each value of the each row in the coordinate matrix, thereby obtaining a target matrix; and
- determining a singular vector corresponding to a minimum singular value of the target matrix as the global normal vector.

8. A device for converting a 3D model texture map, comprising: a memory, a processor, and a program for converting the 3D model texture map stored in the memory and executable on the processor, wherein the program for converting the 3D model texture map, when executed by the processor, performs:
- determining a target plane based on coordinates of multiple initial key points in a 3D model; wherein the 3D model is divided into multiple faces, and the initial key points are boundary vertices of the faces;
- obtaining a key point set corresponding to each initial key point; wherein the key point set corresponding to each initial key point includes the coordinates of the each initial key point and initial key points in a neighborhood of the each initial key point;
- determining Laplace coordinates of each initial key point on the target plane based on each key point set; and
- inserting a texture map corresponding to each face into the target plane based on a preset algorithm and the Laplace coordinates of each initial key point, thereby obtaining a two-dimensional (2D) texture map.

9. A computer-readable storage medium, comprising: a program for converting a 3D model texture map stored thereon; wherein the program for converting the 3D model texture map, when executed by a processor, performs:
- determining a target plane based on coordinates of multiple initial key points in a 3D model; wherein the 3D model is divided into multiple faces, and the initial key points are boundary vertices of the faces;
- obtaining a key point set corresponding to each initial key point; wherein the key point set corresponding to each initial key point includes the coordinates of the each initial key point and initial key points in a neighborhood of the each initial key point;
- determining Laplace coordinates of each initial key point on the target plane based on each key point set; and
- inserting a texture map corresponding to each face into the target plane based on a preset algorithm and the Laplace coordinates of each initial key point, thereby obtaining a two-dimensional (2D) texture map.

* * * * *